No. 781,894. Patented February 7, 1905.

UNITED STATES PATENT OFFICE.

ARTHUR MARIE EUGÈNE DE MONTUREUX, OF PARIS, FRANCE.

METHOD OF VULCANIZING LEATHER COVERS TO RUBBER TIRES.

SPECIFICATION forming part of Letters Patent No. 781,894, dated February 7, 1905.

Application filed November 7, 1904. Serial No. 231,797.

*To all whom it may concern:*

Be it known that I, ARTHUR MARIE EUGÈNE DE MONTUREUX, a citizen of the Republic of France, residing at Paris, France, have invented certain new and useful Improvements in Methods of Vulcanizing Leather Covers to Rubber Tires; and I do hereby declare the following to be a full, clear, and exact description of the invention, such as will enable others skilled in the art to which it appertains to make and use the same.

This invention relates to the method of cold-vulcanizing leather covers or protectors, armored or not, to the surfaces or treads of rubber tires.

The method consists in taking a strip of leather, preferably chrome-tanned leather, of the length required to encompass the tire circumferentially and then roughening one of its surfaces. I preferably card the flesh side of the leather by treating this face with wool-cards and then skive the edges thin to make a close fit to the rubber tire at the edges. I may, if found convenient, skive the edges of the leather strip before carding. The carded and skived piece is then degreased by a suitable solvent of fat, such as benzene. The carded surface is then coated one or more times with a thin solution of rubber. The rubber tire-surface is then roughened by scraping, by rasping with wood-rasps, or in any other desirable manner and also coated one or more times with a thin solution of rubber. Both the coated surface of the leather strip and of the tire, preferably after they are dry or nearly dry, are then brushed over with a solution composed of a halogen carbid, such as tetrachlorid of carbon and a sulfur halide, such as protochlorid of sulfur. These liquids are mixed in proportions of about ninety-six per cent. tetrachlorid of carbon to about four per cent. protochlorid of sulfur; but these percentages may be varied. The tire and cover are then united and caused to adhere by submitting them to heavy pressure, the liquids and the applied pressure effecting a cold vulcanization of the parts together in a most satisfactory manner.

In the case of an armor-tire, in which a strip of leather narrower than the armor-band is placed between this and the tire proper in order to protect the latter from being chafed or worn by the inner ends of the armor-rivets, I first unite such intermediate strip to the rubber tire by the same method as above—that is to say, I clean the intermediate strip of grease by a suitable solvent, skive the edges thereof thin or beveled, and cover the under surface of same with one or more coats of rubber solution, the leather being preferably roughened. I similarly treat the tire, and when the surfaces are dry or nearly dry I apply to the contact-surfaces of the leather and tire the mixture of tetrachlorid of carbon and protochlorid of sulfur and submit the parts to heavy pressure to unite them. When this has been done, the tire, with the intermediate strip attached thereto, and the armor-band are treated and united, as in the case of a tire without an intermediate strip on.

Heavy automobile-tires covered in this way have worn an extremely long time, and the sliding of the vehicle in rounding curves at high speed or when suddenly stopped have never stripped the covering from the wheels even when the leather has been studded with rivets.

Having thus described my invention, what I claim as new therein, and desire to secure by Letters Patent, is—

1. The method of uniting leather covers or armors to rubber tires, which consists in roughening the surface of the leather, degreasing it, and applying thereto a rubber solution, roughening the rubber, then applying to the surface so treated, a solution consisting of tetrachlorid of carbon and protochlorid of sulfur and then uniting the parts, substantially as described.

2. The method of uniting leather covers or armors to rubber tires, which consists in carding the surface of the leather, degreasing it, coating the surface with a rubber solution, roughening the surface of the tire, coating it with rubber solution, then coating the surfaces of the leather and rubber so prepared with a solution composed of halogen carbid and a sulfur halide and finally uniting the surfaces so coated, substantially as described.

3. The method of uniting leather covers or armors to rubber tires, which consists in carding the flesh side of the leather, degreasing it, coating the carded surface with a thin solution of rubber, rasping the surface of the rubber tire, coating it with a thin solution of rubber, then coating the surfaces so treated with a solution of tetrachlorid of carbon and protochlorid of sulfur and finally uniting the parts by pressure, substantially as described.

4. The method of covering tires, which consists in carding the flesh side of chrome-tanned leather, skiving the edges thin, degreasing the leather with benzene, coating the carded surface with a thin solution of rubber, rasping the surface of the rubber tire, coating it with a thin solution composed of tetrachlorid of carbon and protochlorid of sulfur, and finally uniting the surfaces under heavy pressure, substantially as described.

In testimony that I claim the foregoing as my invention I have signed my name in presence of two subscribing witnesses.

ARTHUR MARIE EUGÈNE DE MONTUREUX.

Witnesses:
    JOHN BAKER,
    ALCIDE FABE.